(No Model.)
R. K. EVANS.
HOSE COUPLING.
No. 494,918.
Patented Apr. 4, 1893.
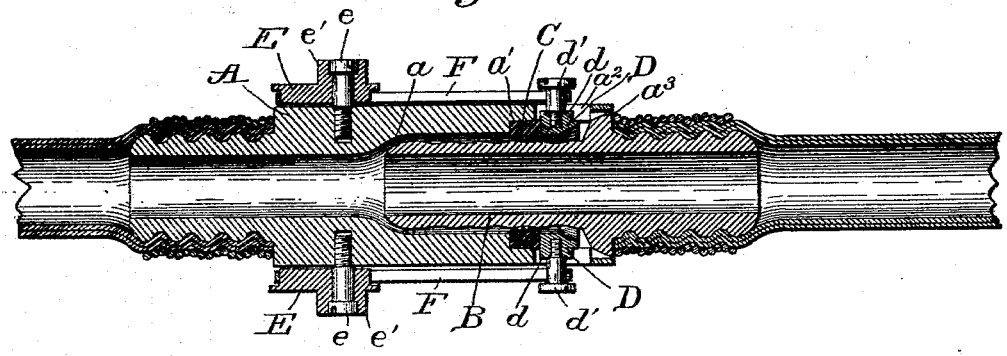
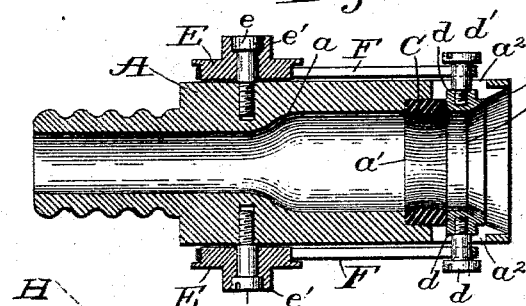
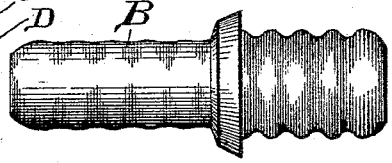
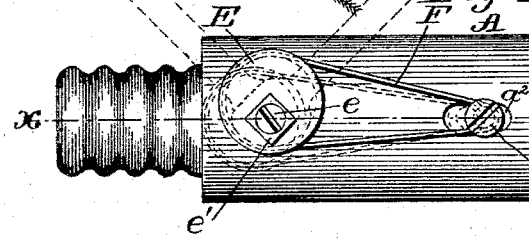
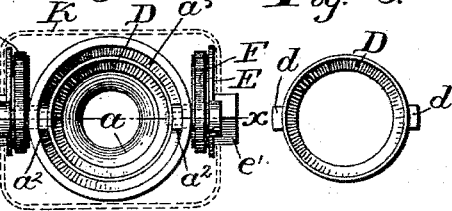
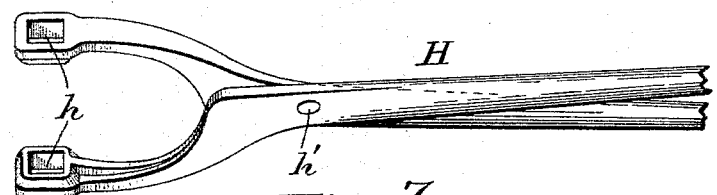
Witnesses;
Percy C. Bowen
John C. Wilson
Inventor;
Robert K. Evans
By Whitman & Wilkinson
Attorneys.

UNITED STATES PATENT OFFICE.

ROBERT KENNON EVANS, OF THE UNITED STATES ARMY.

HOSE-COUPLING.

SPECIFICATION forming part of Letters Patent No. 494,918, dated April 4, 1893.

Application filed March 14, 1892. Renewed December 8, 1892. Serial No. 454,428. (No model.)

*To all whom it may concern:*

Be it known that I, ROBERT KENNON EVANS, lieutenant United States Army, a citizen of the United States, stationed at Fort Leavenworth, in the county of Leavenworth and State of Kansas, have invented certain new and useful Improvements in Hose-Couplings; and I do hereby declare the following to be a full, clear, and exact description of the invention, such as will enable others skilled in the art to which it appertains to make and use the same.

My invention relates to hose couplings, or detachable pipe couplings, and it consists of certain novel features hereinafter described and claimed.

Reference is had to the accompanying drawings wherein the same parts are indicated by he same letters.

Figure 1 represents a central longitudinal section of the ends of two lengths of hose coupled together. Fig. 2 represents a section through the line $x\ x$ of Figs. 4 and 5, of the female portion or socket of the coupling. Fig. 3 represents a side elevation of the male portion or nozzle of the coupling. Fig. 4 represents a side elevation, and Fig. 5 represents a front view of the female portion or socket of the coupling. Fig. 6 represents a front view of the steel compressor ring, and Fig. 7 represents a perspective view of one form of spanner that may be used to turn the eccentrics.

A represents a metal socket having slope $a$, shoulder $a'$, slots $a^2$, and slope $a^3$; into the mouth of which the metal nozzle B enters freely. This nozzle is preferably roughened externally as shown.

The two parts of the hose are coupled together by compressing the rubber ring C between the shoulder $a'$ and the compressor ring D which is done by turning the eccentrics E from the position shown in full lines to that shown in dotted lines in Fig. 4. The eccentrics move about pins $e$, and are provided with angular heads $e'$ adapted to engage in the angular holes $h$ on the spanner H, which is arranged like a pair of shears. The eccentrics are connected to the compressor ring D by the links F, and pins $d'$ which screw into lugs $d$ in the said ring, both pins and lugs having a small fore and aft motion in the slots $a^2$.

To prevent injury from rough handling, the socket A and its connections may be inclosed in a box as shown in dotted lines K in Fig. 5.

The operation of the device is as follows: The parts A and B being disengaged as shown in Figs. 2 and 3, the part B is slipped into A and the rubber ring C is compressed between the compressor ring D and the shoulder $a'$ by turning the eccentrics E. The rubber ring being compressed axially bulges in radially and firmly grips the roughened surface of the nozzle B, thus making a firm and water-tight joint.

Having thus described my invention, what I claim, and desire to secure by Letters Patent of the United States, is—

In a hose coupling, the combination with a socket A having a bell-mouthed aperture therein, with an annular shoulder $a'$ and slots $a^2$, of a rubber ring C abutting against said annular shoulder, a compressor ring D, having pins $d'$ attached thereto, eccentrics E, and links F, as and for the purposes described.

In testimony whereof I affix my signature in presence of two witnesses.

ROBERT KENNON EVANS.

Witnesses:
W. A. NICHOLS,
B. H. GILMAN.